(No Model.)

S. STRUNZ.
LEACHING APPARATUS.

No. 260,714. Patented July 4, 1882.

Witnesses.
Robert Everett
J. A. Rutherford

Inventor.
Stephen Strunz.
By James L. Norris
Atty.

UNITED STATES PATENT OFFICE.

STEPHEN STRUNZ, OF PITTSBURG, PENNSYLVANIA.

LEACHING APPARATUS.

SPECIFICATION forming part of Letters Patent No. 260,714, dated July 4, 1882.

Application filed May 17, 1882. (No model.)

*To all whom it may concern:*

Be it known that I, STEPHEN STRUNZ, a citizen of the United States, residing at Pittsburg, Allegheny county, Pennsylvania, have invented a new and useful Improvement in Leaching Apparatus, of which the following is a specification.

My invention relates to leaching apparatus in which the liquid removes the soluble matter from the material through which it passes, and the object thereof is to provide a filter for separating the caustic lye solution from the lime, as well as any liquid from solid matter or precipitates.

Figure 1:
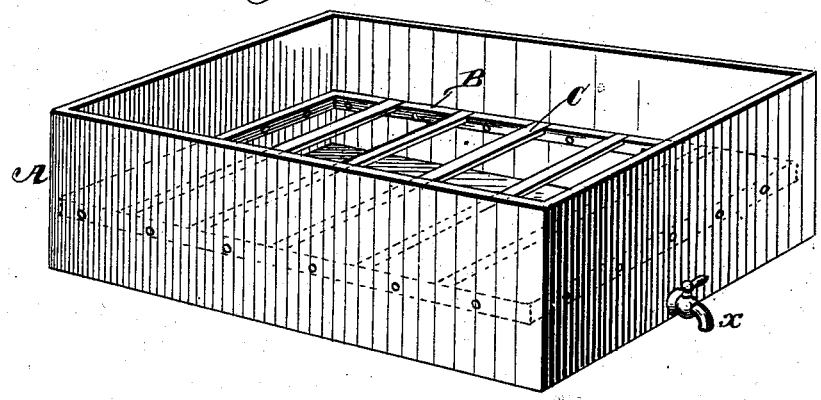
Figure 2:
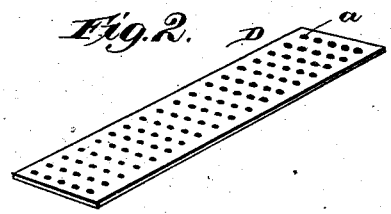
Figure 3:
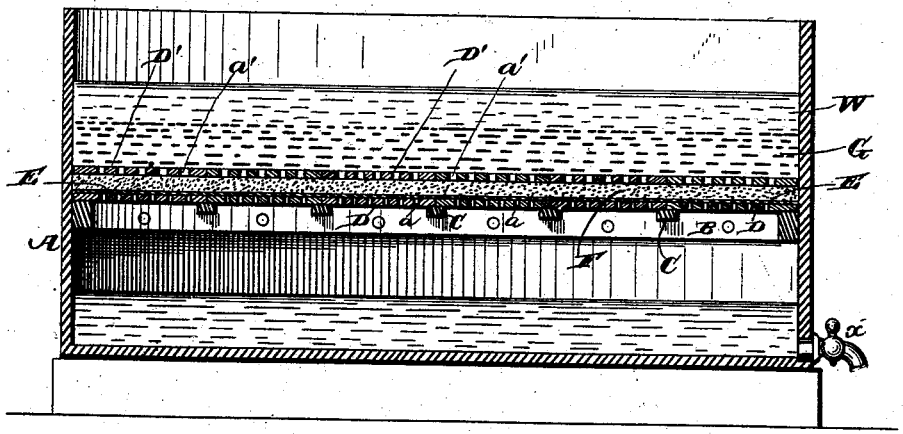

Referring to the drawings, Figure 1 is a perspective view, illustrating my invention. Fig. 2 is a detail view of a detached part. Fig. 3 is a vertical longitudinal section taken through the center of Fig. 1.

A in said drawings indicates a square tank, constructed preferably of iron and of any suitable depth and size, according to the requirements of the particular manufacture. Upon the inner surface of the vertical walls of this tank is placed a supporting-strip, B, bolted to the said walls, and extending entirely around the said tank. Transverse slats C may be laid in recesses formed in the strips extending along the sides of the tank, as shown in Figs. 1 and 3. Upon these slats, and having their ends supported by the said strip B, I place metal plates D, preferably formed of iron, and having formed in each a number of small equidistant perforations, *a*. The plates D are of such width that they extend from end to end of the tank A, entirely dividing the lower from the upper portion of the tank.

Upon the upper surface of the plates D is laid a sheet of muslin, E, and upon said muslin is spread a layer of sand, F, about one inch in depth. Upon the surface of this sand I lay a second series of perforated plates, D', having perforations *a'*, similar to the perforations *a* in the plates D, save that they are larger.

The mode of using this apparatus is as follows: The soda-ash being first dissolved in water, lime is added while the liquor is boiling, to render it caustic, this process being that usually employed. After the solution has been carried to the proper point the clear lye is drawn off, and the undissolved or remaining lime is laid upon the plates D' of the filter and allowed to remain until the lye has filtered out and the lime is dry. Water is then poured upon the lime to a depth about equal to the depth of the layer of lime and soda-ash which lies upon the filtering-plates D', and as it passes through it carries with it the lye still remaining in the lime, leaving the latter without strength, and obtaining all the lye from the materials used within several hours time.

A filtering apparatus prepared in this manner will last a year or more, and will serve to filter one thousand tons of soda-ash without removing the sand.

The filtering-tank may be constructed of any shape or proportions within the limits of my invention. A discharge-cock, *x*, is attached to one end to permit the withdrawal of filtered liquor from the lower portion of the tank.

What I claim is—

In a leaching apparatus, a filter composed of a suitable tank having a series of perforated plates which separate the lower and upper portions of said tank, a sheet of muslin, or equivalent material, laid upon said plates, forming a basis for a layer of sand, and a second series of perforated plates for covering the sand, all substantially as and for the purpose set forth.

In testimony whereof I have hereunto set my hand in the presence of two subscribing witnesses.

S. STRUNZ.

Witnesses:
G. STENGEL,
D. P. BERG.